Figure 1:
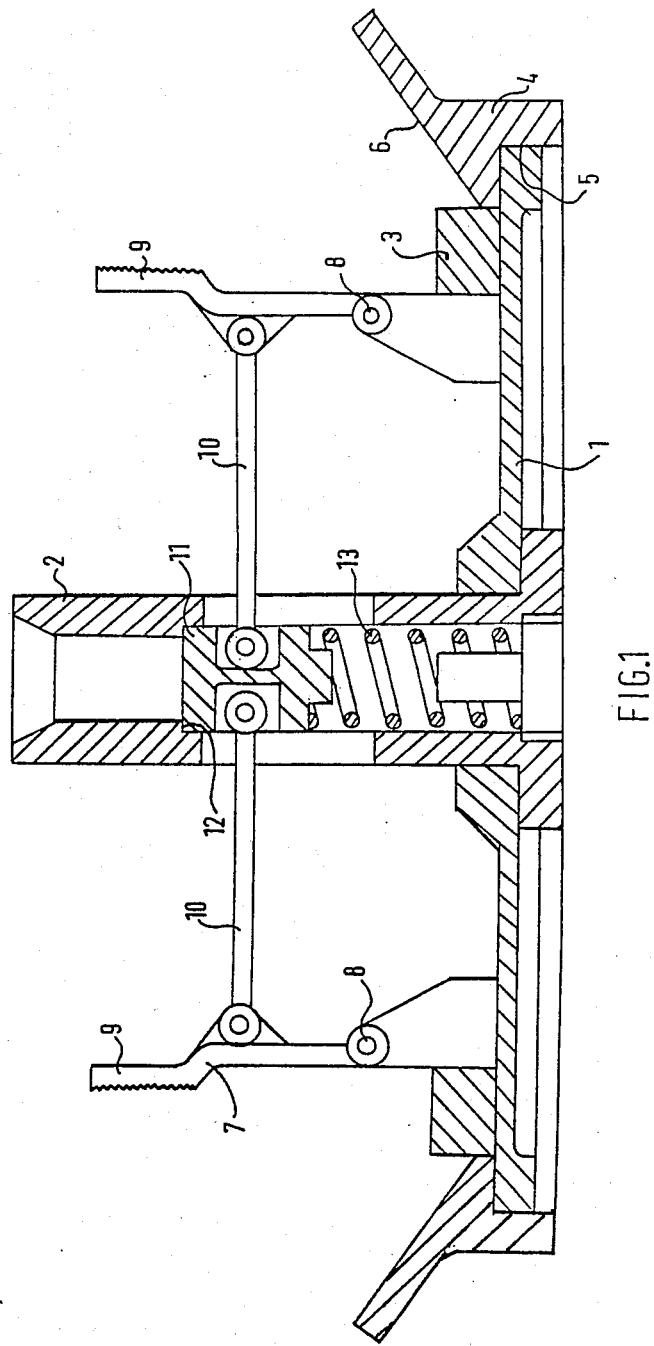

United States Patent [19]

Trethowan

[11] Patent Number: 4,637,644
[45] Date of Patent: Jan. 20, 1987

[54] TIRE TRANSPORT JIG

[75] Inventor: Jack Trethowan, Birmingham, England

[73] Assignee: W & A Bates Limited, England

[21] Appl. No.: 732,268

[22] Filed: May 9, 1985

[30] Foreign Application Priority Data

May 22, 1984 [GB] United Kingdom ............... 8413084

[51] Int. Cl.$^4$ ............................ B66C 1/54; B79H 5/02
[52] U.S. Cl. ...................................... 294/97; 294/86.4; 294/93; 425/38
[58] Field of Search .................. 294/97, 93, 94, 95, 294/96, 86.24, 88, 67.1, 86.4; 414/429, 428, 225, 226, 910, 911; 425/38, 58, 36

[56] References Cited

U.S. PATENT DOCUMENTS 3,845,979 11/1974 Schatz et al. .................... 294/86.4
4,472,125 9/1984 Kubo et al. ......................... 294/93

Primary Examiner—James B. Marbert
Attorney, Agent, or Firm—Stevens, Davis, Miller & Mosher

[57] ABSTRACT

A jig for transporting a green tire carcass in a horizontal position without causing any distortion comprising a lower bead support, a concentric tire shoulder support and a set of fingers for supporting the upper bead of the carcass.

The fingers are spring biassed towards a position in engagement with the upper bead, but may be moved radially inwards while a tire carcass is either placed on or removed from the jig.

8 Claims, 3 Drawing Figures

TIRE TRANSPORT JIG

This invention relates to a tire transport jig used to carry unvulcanized or green tire carcasses between the building or painting machines and unvulcanized machines and to store the carcasses between these operations.

Green tires or the carcasses thereof are usually transported suspended on a hook or saddle or alternatively by placing in a hammock formed by a strip of flexible material wider than the tire which engages the tire around its lower outer periphery. Both these transportation systems, however, distort the uncured tires particularly when tires are left in them for a substantial time and this results in tires of poor uniformity.

It is an object of the present invention to provide a transport jig which allows for the transportation of green tires without deformation.

According to the present invention a tire transport jig comprises a horizontally-disposed, fixed lower bead support, a concentric, horizontally-disposed fixed tire shoulder support and an upper bead holding device comprising a set of radially movable upper bead engagement members and means to effect said radial movement between a first position in engagement with an upper tire bead and a second position out of engagement.

The lower bead support and tire shoulder support are preferably interengaged annular members. The shoulder support may be a conical surface arranged to contact the tire shoulder when a tire is placed horizontally with its lower bead resting on the lower bead support.

The means to effect radial movement of the upper bead engagement members preferably comprises a single control member and connectors from the control member to each of the engagement members such that movement of the control member moves the engagement members in synchronization. The connectors preferably comprise struts pivotally connected between each engagement member and the control member. Each engagement member may comprise a lever pivotally mounted at the lower end such that the upper end may be moved radially inwards and outwards by the connected strut. The control member may be a piston sliding in a guide extending along the axis of the annular members. The piston is preferably spring biased in the upward direction so that in the released position the spring bias pushes the engagement members radially outwards and to move said members radially inwards the piston needs to be moved against the spring bias. Preferably the spring bias moves the piston upwards along the axis and an abutment surface on the upper end of the piston is provided so that a tire loading device may open the jig by depressing the piston to move the engagement members inwards to accept the tire. Alternatively the spring bias may be in the opposite direction and the piston operated from beneath the jig.

The upper bead engagement members are preferably spaced apart fingers equally spaced around the bead so that the tire may be loaded into the jig by means of a set of spaced apart carrier fingers on a jig loading device.

Figure 2:
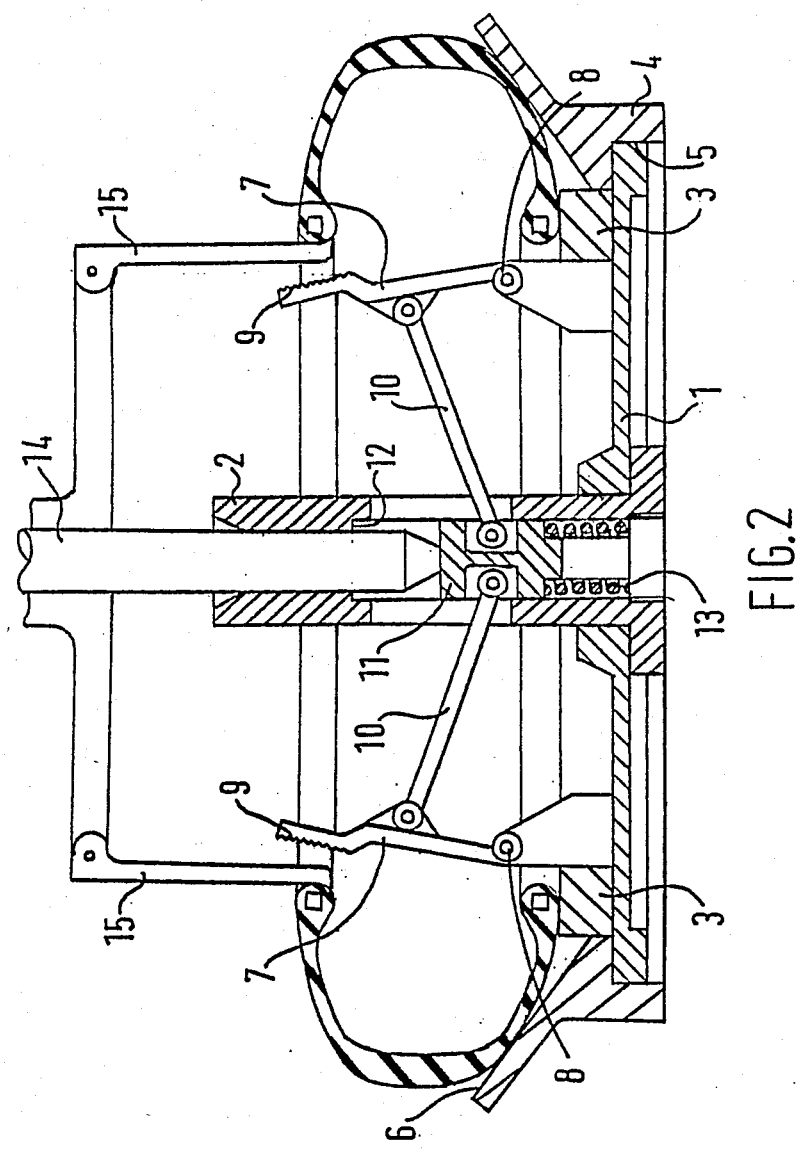
Figure 3:
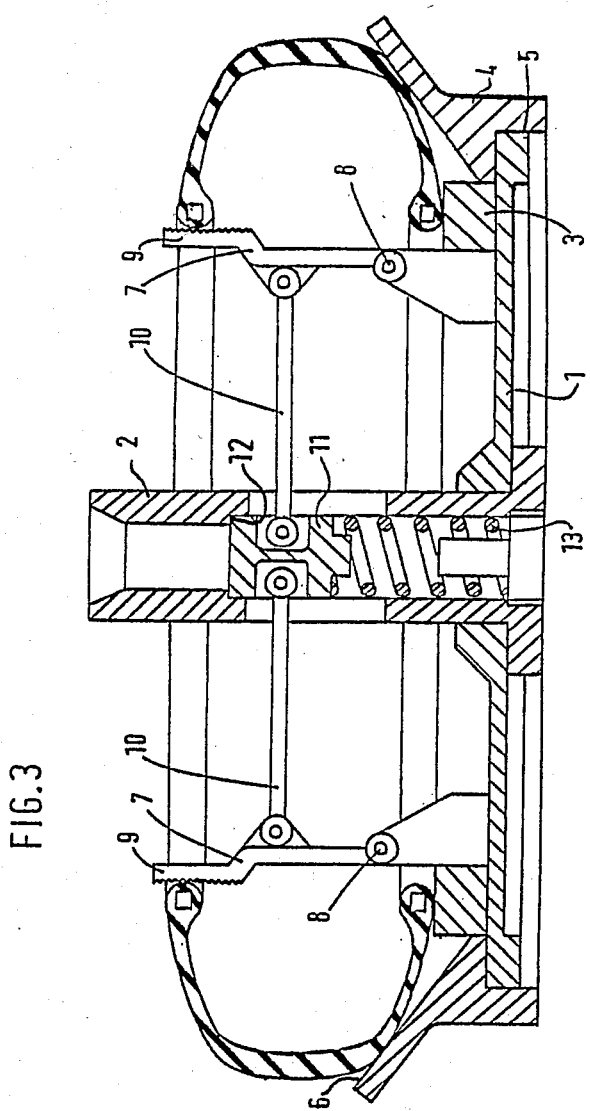

Further aspect of the invention will be apparent from the following description, by way of example only, of one embodiment in conjunction with the attached diagrammatic drawings in which:

FIG. 1 is a cross-sectional side view of the tire transport jig in the unloaded condition; p FIG. 2 is a similar view with the transport jig in the part-loaded condition, and FIG. 3 is a similar view with the transport jig loaded with a green tire.

The tire transport jig comprises a steel disc base plate 1 mounted horizontally upon a tubular centre column 2. A lower tire bead support is formed by an annular support ring 3 having a diameter to suit the tire to be transported and a thickness to reach the bead according to the tire position in the jig as will be understood. An annular tire shoulder support ring 4 is located on the outer edge 5 of the base plate 1 and this support ring has a conical tire shoulder engagement surface 6 facing upwardly and positioned relatively to the lower bead support ring 3 to suit the tire to be transported. The bead support ring 3 and the shoulder support ring 4 may be formed separately, as shown in the drawings, or integrally.

Four upper bead holding fingers 7 are provided spaced apart around the jig. Each finger 7 comprises a strut having its lower end 8 pivotally mounted on the base plate 1 so that its upper end 9 may be moved radially inwards and outwards. The upper end 9 has its outer surface grooved or knurled at the point at which it contacts the upper tire bead.

Each bead holding finger 7 is connected by an operating strut 10 to a piston 11 which slides vertically in the centre column 2. The piston is biased upwards against a limit stop shoulder 12 by a coil spring 13 and the geometry of the struts is such that in the uppermost position of the piston 11 the fingers 7 are all at their radially outer positions. Downward movement of the piston 11 against the coil spring 13 thus moves all the four fingers radially inwards.

Loading of a tire to the transport jig is effected by taking the jig as shown in FIG. 1 and pressing the piston 11 downwards by a release pin 14, (see FIG. 2). This pivots the fingers 7 inwards and allows the tire, which may be held on for example four carrier fingers 15, to be lowered onto the jig. The tire shoulder engages the conical surface 6 and the lower bead engages the lower support 3. Note that as shown in FIG. 2 the jig fingers 7 and the carrier fingers 15 are both shown whereas in reality they are spaced around the tire so that one set of fingers 15 (i.e. the carrier fingers) is circumferentially spaced from the other set of fingers 7. The release pin 14 is then moved upwards from the jig and the spring 13 moves the piston 11 to cause the four fingers 7 to engage and hold the upper tire bead. Finally, the carrier fingers 15 are removed and the tire is then fully located upon the jig for transport elsewhere as can be seen in FIG. 3.

In a modification, not shown, the piston 11 may be biased downwards rather than upwards, and the release pin 14, which pushes the piston downwards to move the fingers 7 radially inwards, replaced by an actuating post mounted separately from the jig underneath the base plate. The geometry of the struts 10, the fingers 7 and piston 12 is also changed so that when the whole jig is lowered on to the actuating post, the piston is forced upwards against spring biasing, to move the fingers 7 radially inwards to enable a tire to be placed on the jig. When the jig and tire are lifted away from the actuating post, the piston moves downwards and the fingers 7 move radially outwards against the upper bead of the tire to hold to firmly on the jig.

The resultant jig supports the green tire in a manner to retain its shape and yet is easily loaded and unloaded by mechanical means.

I claim:

1. A tire transport jig comprising a horizontally disposed, fixed lower bead support, a concentric, horizontally-disposed fixed tire shoulder support and an upper bead holding device comprising a set of radially movable upper bead engagement members and means to effect said radial movement between a first position in engagement with an upper tire bead, and a second position out of engagement, said means to effect radial movement of the upper bead engagement members comprising a single control member and connected from the control member to each of the engagement members by connectors such that movement of the control member moves the engagement members in synchronization.

2. A tire transport jig according to claim 1 wherein the lower bead support and tire shoulder support are interengaged annular members.

3. A tire transport jig according to claim 1 wherein the shoulder support comprises a conical surface arranged to contact tire shoulder when a tire is placed horizontally with its lower bead resting on the lower bead support.

4. A tire transport jig according to claim 1 wherein the connectors comprise struts pivotally connected between each engagement member and the control member.

5. A tire transport jig according to claim 4 wherein said engagement member comprises a lever pivotally mounted at the lower end such that the upper end may be moved radially inwards and outwards by the connected strut.

6. A tire transport jig according to claim 1 wherein the control member comprises a piston sliding in a guide extending along the axis of the annular members.

7. A tire support jig according to claim 6 wherein the piston is spring biased to push the engagement members radially outwards so that movement of the piston by an external means moves the engagement members radially inwards.

8. A tire transport jig according to claim 1 wherein the upper bead engagement members are fingers equally spaced apart around the jig and the bead of a tire carcass positioned thereon.

* * * * *